Sept. 15, 1942.  C. BOSCH  2,296,015
DRY PLATE RECTIFIER ELEMENT OR THE LIKE
Filed March 22, 1940
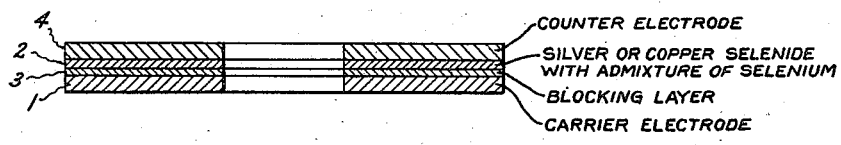
Inventor:
Carl Bosch,
by Harry E. Dunham
His Attorney.

Patented Sept. 15, 1942

2,296,015

UNITED STATES PATENT OFFICE 2,296,015

DRY PLATE RECTIFIER ELEMENT OR THE LIKE

Carl Bosch, Berlin, Germany, assignor to General Electric Company, a corporation of New York Application March 22, 1940, Serial No. 325,465
In Germany December 14, 1938

6 Claims. (Cl. 175—366)

My invention relates to dry plate electrode systems of non-symmetrical conductivity, particularly to dry plate rectifiers and the like, and its object is to provide devices of this type which, as compared with similar devices employed heretofore, are characterized by being capable of a higher current and voltage rating and at the same time by a good rectification factor.

In accordance with the present invention the semi-conductor layer of the dry plate element or cell is composed of a copper or silver selenide with an admixture of selenium. The per cent of added selenium may vary, according to the use to which the elements are to be put, from approximately 20 per cent to approximately 60 per cent. With an addition of a relatively small amount, for example, 20 per cent of selenium, cells having high current rating are obtained, while a higher admixture of, for example, 30 to 60 per cent of selenium yields cells having a very high voltage rating.

One electrode of the cell or element in accordance with the invention is composed of a light metal such as aluminum, magnesium, or beryllium, preferably aluminum, or of a suitable alloy of metals of this group, and the opposite electrode is composed of a metal such as lead or silver which does not form a blocking layer with the mixture which constitutes the semi-conductor layer.

The usual selenium rectifier cells as employed heretofore have a current loading capacity ranging up to a direct current average value of 0.1 ampere per square centimeter. In a rectifier cell in accordance with the present invention, however, it is possible to obtain a current loading capacity up to 1.5 amperes per square centimeter, the current loading capacity thus being increased a full fifteen fold in the rectifier of my invention over the similar rectifiers employed heretofore. For example, a cell in accordance with the present invention having an effective surface of 20 square millimeters may be arranged to transmit 250 milliamperes without overloading the cell. Correspondingly, by utilizing the method of construction in accordance with my invention, the voltage rating of 20 volts which usually characterizes similar rectifiers known heretofore may be increased to an effective voltage rating of 100 volts by 50 per cent addition of selenium to the material constituting the semi-conductor layer, the current rating at the same time being for example 15 milliamperes, or about five fold the current rating of the usual similar cell.

In each cell constructed in accordance with the invention, a noteworthy rectification factor is obtained since the resistance of the cell in the forward or current flow direction is very slight and in the blocking or reverse current direction is exceedingly high.

It will be readily seen that the greatly improved results which are attainable from a rectifier or like cell in accordance with my present invention are obviously due to a construction of these cells which is fundamentally different as compared with rectifiers or the like of the selenium type heretofore employed, since in cells in accordance with the present invention the blocking layer is not, as in the above mentioned prior rectifiers, between the semi-conductor layer and the electrode opposite to the light metal electrode but between the semi-conductor layer and the light metal electrode.

It has been found that the reverse current of cells constructed in accordance with my present invention may be yet further reduced if the semi-conductor layer material has added thereto a suitable amount, for example 0.5 per cent to 10 per cent, of iodine, mercury, or sulphur. These admixtures obviously have the effect of sensitizing the light metal electrode surface, in contact with the semi-conductor layer, in the sense of facilitating the formation of the blocking layer.

My invention will be better understood from the following description when considered in connection with the accompanying drawing and its scope will be pointed out in the appended claims.

Referring to the drawing the single figure thereof is a sectional view of a dry plate electrode element or cell embodying my invention.

In the figure the numeral 1 designates an electrode formed preferably of one of the light metals aluminum, magnesium, or beryllium, or an alloy of these metals. The numeral 2 designates a semi-conductor layer of silver or copper selenide having an admixture of selenium, and if desired in certain cases, of iodine, mercury, or sulphur. The numeral 3 designates the blocking layer which forms between the light metal electrode and the semi-conductor layer. The numeral 4 designates the electrode opposite to the light metal electrode in contact with the semi-conductor layer and formed preferably of lead or silver.

The production of rectifier or like cells, such as shown in the figure for example, may be effected in accordance with the following process.

On a light metal plate, such as electrode 1, which is clean and free from grease and which may be formed of aluminum for example, the semi-conductor substance consisting of silver or copper selenide having selenium added thereto is applied in the pulverized condition to form the semi-conductor layer, as 2, and is compressed together with the electrode opposite to the light metal electrode, as 4, consisting of lead or silver, under high pressure of the order of 500 kg. per square centimeter. To increase the stability and permanence of the cell the semi-conductor layer may be sintered by a temporary heating to a temperature above the melting point of selenium.

If it is desired that one of the previously mentioned materials, iodine, mercury or sulphur be added to the material of the semi-conductor layer, this may be accomplished by the addition, to the above described pulverized silver or copper selenide having selenium added thereto, of an alcoholic iodine solution of silver iodide, of iodide of mercury or of sulphur dissolved in carbon bisulphide, the solvent being subsequently removed by drying.

It may be desirable to subject the cell, produced in accordance with the foregoing pressure process, to a preliminary loading by passing a suitable current through the cell for a short time in the blocking or reverse current direction.

The hereinabove described process of manufacture of dry plate electrode cells in accordance with the present invention is characterized by extreme simplicity. Aside from cleaning the light metal electrode and removing any grease film therefrom no special preliminary treatment of this electrode element is required. Further, all special procedures having as their object the production of an effective and practically operative modification of the semi-conductor material are dispensed with. It is immaterial, for the operativeness and serviceability of the cells, whether the selenium powder be added in its amorphous or in its crystalline form.

My invention has been described herein in a particular embodiment for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. A dry plate element comprising a metal electrode, a semi-conductor layer in contact with said electrode and formed of material of the group comprising silver selenide and copper selenide, each of said selenides having an admixture of selenium therein and an admixture of the group of materials comprising iodine, mercury, and sulphur, and a second metal electrode in contact with said layer.

2. A dry plate element comprising a metal electrode formed of material of the group comprising aluminum, magnesium, beryllium, and alloys of said metals, a semi-conductor layer in contact with said electrode and formed of material of the group comprising silver selenide and copper selenide, each of said selenides having an admixture of selenium therein and an admixture of the group of materials comprising iodine, mercury, and sulphur, and a second metal electrode in contact with said semi-conductor layer and formed of a material incapable of forming a blocking layer between said second metal electrode and said semi-conductor layer.

3. A dry plate element comprising a metal electrode formed of material of the group comprising aluminum, magnesium, beryllium, and alloys of said metals, a semi-conductor layer in contact with said electrode and formed of material of the group comprising silver selenide and copper selenide, each of said selenides having an admixture of selenium therein and an admixture of the group of materials comprising iodine, mercury, and sulphur, and a second metal electrode in contact with said layer and formed of a material of the group comprising lead and silver.

4. A dry plate element comprising a metal electrode, a semi-conductor layer in contact with said electrode and formed of material of the group comprising silver selenide and copper selenide, each of said selenides having selenium added thereto to the extent of approximately 20 per cent of the resulting mixture and an admixture of the group of materials comprising iodine, mercury, and sulphur, and a second metal electrode in contact with said layer.

5. A dry plate element comprising a metal electrode, a semi-conductor layer in contact with said electrode and formed of material of the group comprising silver selenide and copper selenide, each of said selenides having selenium added thereto to the extent of approximately 50 per cent of the resulting mixture and an admixture of the group of materials comprising iodine, mercury, and sulphur, and a second metal electrode in contact with said layer.

6. A dry plate element comprising a carrier electrode, a semi-conductor layer in contact with said electrode and formed of material of the group comprising silver selenide and copper selenide, each of said selenides having therein an admixture of selenium of between 20 per cent and 60 per cent and an admixture of the group of materials comprising iodine mercury and sulphur of between 0.5 per cent and 10 per cent, and a counter-electrode in contact with said layer.

CARL BOSCH.